US 8,146,108 B2

(12) United States Patent
Zhang

(10) Patent No.: US 8,146,108 B2
(45) Date of Patent: Mar. 27, 2012

(54) DRIVER ASSISTED ASYNCHRONOUS COMMAND PROCESSING

(75) Inventor: Guofeng Zhang, Shanghai (CN)

(73) Assignee: VIA Technologies, Inc., Taipei (TW)

(*) Notice: Subject to any disclaimer, the term of this patent is extended or adjusted under 35 U.S.C. 154(b) by 1055 days.

(21) Appl. No.: 11/582,021

(22) Filed: Oct. 17, 2006

(65) Prior Publication Data

US 2007/0106999 A1 May 10, 2007

Related U.S. Application Data

(60) Provisional application No. 60/727,635, filed on Oct. 17, 2005.

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/321

(58) Field of Classification Search ............ 719/321
See application file for complete search history.

(56) References Cited

U.S. PATENT DOCUMENTS

| 5,530,815 | A | * | 6/1996 | Nabekura et al. ............ 712/227 |
| 6,018,353 | A | * | 1/2000 | Deering et al. .............. 345/537 |
| 6,112,019 | A | * | 8/2000 | Chamdani et al. ........... 712/214 |
| 2003/0140179 | A1 | * | 7/2003 | Wilt et al. .................... 709/321 |
| 2005/0041031 | A1 | * | 2/2005 | Diard ........................... 345/505 |
| 2007/0088792 | A1 | * | 4/2007 | Piper et al. ................... 709/207 |

OTHER PUBLICATIONS

Paul Nettle, "Lightmap Render States", 2001, pp. 1-3.*

* cited by examiner

Primary Examiner — Andy Ho
Assistant Examiner — Timothy A Mudrick
(74) Attorney, Agent, or Firm — K&L Gates LLP

(57) ABSTRACT

A method for assisting multi-threaded command execution by a driver in a multi-core computer system, is disclosed. The method includes distinguishing asynchronous commands from synchronous commands, buffering the asynchronous commands in a buffer, processing the synchronous commands directly in a CPU driver thread, processing the asynchronous commands from the buffer by one or more CPU work threads, wherein multiple threads of the multi-core computer system can be utilized at the same time; and managing the buffer after the buffer is processed by the CPU work thread, wherein the command executions appear to be just like single-threaded to application software.

23 Claims, 5 Drawing Sheets

S3U05-0043

S3U05-0043

… (5)

DRIVER ASSISTED ASYNCHRONOUS COMMAND PROCESSING

CROSS REFERENCE

This application claims the benefits of U.S. Patent Application Ser. No. 60/727,635, which was filed on Oct. 17, 2005, and entitled "Driver Optimization for CPU Bound Applications on MultiCore-CPU."

BACKGROUND

The present invention relates generally to computer device drivers, and, more particularly, to driver assisted asynchronous command processing.

A typical computer graphics system comprises a graphics adapter providing a frame buffer and graphics acceleration hardware, together with a software device driver providing an interface between the graphics adapter hardware and the operating system and/or applications running on top of the operating system. The graphics adapter, which contains at least one graphics processing unit (GPU), is a computer component designed to convert the logical representation of visual information into a signal that can be used as an input for a display medium. The graphics adapter serves to facilitate a display of elaborate graphics while relieving the operating system of computational responsibility for graphics processing, improving overall performance.

A device driver, often called a driver for short, is a computer program that enables another program, typically an operating system (OS), to interact with hardware devices. In a Windows operating system environment, when an application calls a Win32 function with device-independent graphics requests, the Graphics Device Interface (GDI) interprets these instructions and calls the display driver. The display driver then translates these requests into commands for the video hardware to draw graphics on the screen.

GDI calls Device Driver Interface (DDI) functions to pass data to the driver. When an application makes a request of GDI, and GDI determines that the driver supports the relevant function, GDI calls that function. It is the responsibility of the driver to provide the function and return to GDI upon the function's completion.

There is a growing trend in computer systems to employ multi-core central processing units (CPUs), which have multiple threads that can process multiple commands simultaneously. A thread in computer science is short for a thread of execution. Threads are a way for a program to split itself into two or more simultaneously running tasks. Multiple threads can be executed in parallel on many computer systems. This multithreading generally occurs by time slicing (where a single processor switches between different threads) or by multiprocessing (where threads are executed on separate processors). The aforementioned multi-core CPUs are a subject of the later kind of multi-threading, i.e., multiprocessing.

But traditional graphics drivers are designed to run on a single thread of a computer CPU, and they also needs to synchronize with a rendering of a graphics processing unit (GPU). So the traditional graphics driver cannot benefit from multi-core CPU, which can process multiple tasks simultaneously.

Besides, most graphics application software are not written or well written with multi-thread. The application software by itself also cannot benefit from multi-core CPU. In many cases, application running speeds are limited by the CPU execution.

It is therefore desirable for a multi-core CPU computer system to run graphics driver in different thread(s) of graphics application, so that the graphics performance of the computer system can be truly enhanced.

SUMMARY

In view of the foregoing, this invention provides a method for assisting multi-threaded command execution by a driver in a multi-core computer system, the method comprising distinguishing asynchronous commands from synchronous commands, buffering the asynchronous commands in a buffer, processing the synchronous commands directly in a CPU driver thread, processing the asynchronous commands from the buffer by one or more CPU work threads, wherein multiple threads of the multi-core computer system can be utilized at the same time; and managing the buffer after the buffer is processed by the CPU work thread, wherein the command executions appear to be just like a single-thread to application software.

DESCRIPTION

The present disclosure provides a method that separates computer commands into synchronous commands and asynchronous commands, and executes them in multiple CPU threads, so that multiple commands can be executed simultaneously.

Synchronous commands are commands that must be finished before DDI return. On the other hand, asynchronous commands are commands that don't need to be finished before DDI return.

Figure 1:
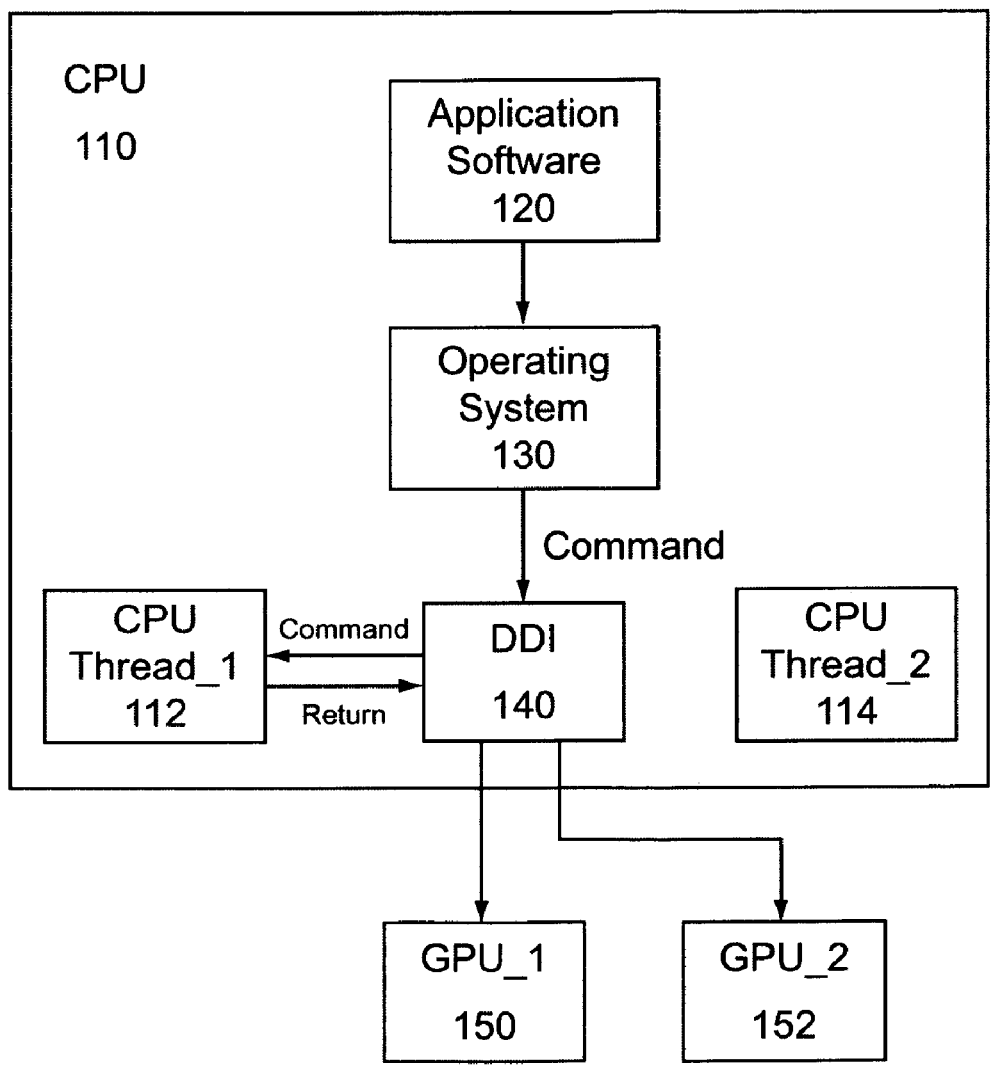
FIG. 1 is a block diagram of a part of a computer system with a multi-core CPU and a DDI of traditional synchronous command processing.

FIG. 1 is a block diagram of a part of a computer system 100 with a multi-core CPU 110 and a device driver interface (DDI) 140 of traditional synchronous command processing. The multi-core CPU 110 has two exemplary CPU threads 112 and 114. DDI 140 passes commands to the CPU for processing and to the graphics processing units (GPUs) 150 and 152 for rendering graphics to display. Even though the multi-core CPU 110 contains two CPU threads 112 and 114, an application software 120 and the DDI 140 are designed to process graphics commands only synchronously on just one CPU thread, i.e., before processing a next command, the DDI 140 has to wait for either the CPU thread 112 to finish a current command processing or the GPU 150 or 152 to finish a current command rendering. If GPU 150 or 152 rendering speed is faster than the command processing speed by CPU thread 112, the CPU 110 become a speed bottleneck, or a CPU bound, in the computer system 100.

Figure 2:
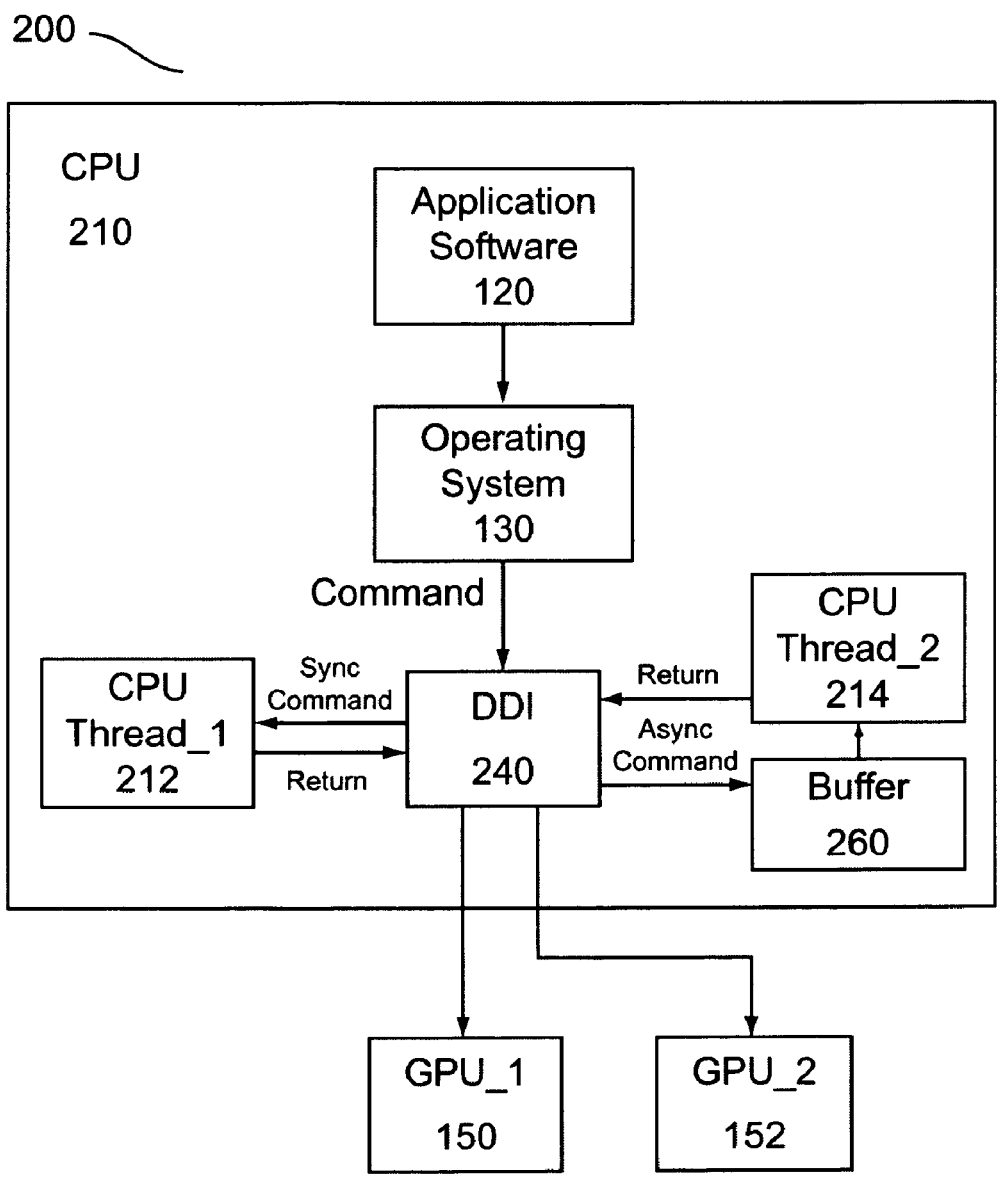
FIG. 2 is a block diagram of a part of a computer system with a multi-core CPU and a DDI of asynchronous command processing according to one embodiment of the present invention.

FIG. 2 is a block diagram of a part of a computer system 200 with a multi-core CPU 210 and a DDI 240 of asynchronous command processing according to one embodiment of the present invention. The multi-core CPU 210 has two exemplary CPU threads 212 and 214. As the thread 212 handles commands directly from the driver 240, it is called a driver thread. The other thread 214 processing buffered commands is called work thread.

Referring to FIG. 2, a command buffer 260 was added to the computer system 200. The DDI 240 can distinguish asynchronous commands and store them in the command buffer 260, while passing only synchronous commands to a driver thread 212 for immediate processing. The buffered commands can be processed by work thread 214 without interfering with the driver thread 212. In this way, both CPU threads 212 and 214 can be utilized, even though the application program itself is written for single thread, it can still benefit from the multi-core CPU 200.

Referring to FIG. 2, the work thread 214 is assigned to process the buffered commands. Every time the DDI 240 puts an asynchronous command into the command buffer 260, the work thread 214 is activated and starts to process the buffered command. When some buffered commands have been processed, the work thread 214 releases the corresponding part of the command buffer.

The DDI function 240 can also mark some commands that need to be traced with event tags. The work tread 214 will write the event tags back after the commands being executed.

Figure 3A:
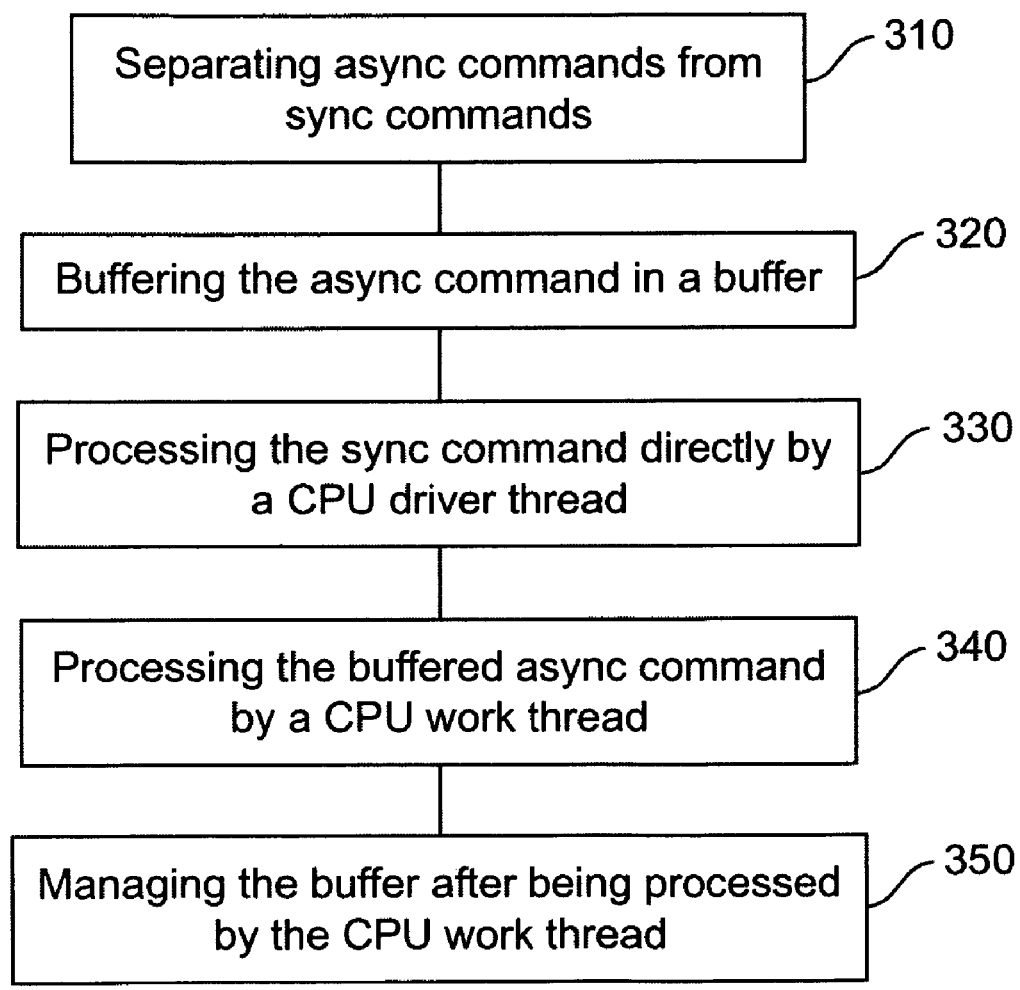
FIG. 3A is a flow chart illustrating steps carried out by a DDI for multi-threading according to one embodiment of the present invention.

FIG. 3A is a flow chart illustrating major steps carried out by a DDI for multi-threading according to one embodiment of the present invention. A first step to 310 is to distinguish asynchronous commands from synchronous commands. The nature of the commands, i.e., synchronous or asynchronous, is determined by commands themselves, e.g. some resource management commands are synchronous as the driver must finish the task before return, and they need to be executed immediately. In Windows, DirectX driver, CreateSurface, DestroySurface, CreateD3 Dbuffer, DestroyD3 Dbuffer, LockD3 Dbuffer and UnlockD3 Dbuffer are these kinds of commands.

DDLock and DDUnlock functions require synchronization between CPU and GPU, so they cannot be multi-threaded either.

Rendering commands in D3DdrawPrimitives2 function, on the other hand, are asynchronous commands that can be buffered and lets the work thread 212 process them independently. The D3dDrawPrimitives2 function renders primitives and returns the updated render state.

Queries create, destroy and sending are treated as asynchronous commands, but they are buffered with event tags, so upon completion of these commands by a work thread, the event tags will be written back. On the other hand, query read is treated as a synchronous command and processed immediately by the driver thread.

Referring to FIG. 3A, after synchronous and asynchronous commands being distinguished in step 310, those asynchronous commands are then buffered in step 320. Step 330 shows the CPU driver thread processing synchronous commands directly. Step 340 shows a CPU work thread processing the buffered asynchronous commands simultaneously, so that both the driver thread and the work thread are utilized at the same time. Upon completion of processing the buffered commands, the CPU work thread manages the buffer in step 350, so that the processed buffers can be freed up for future commands.

Figure 3B:
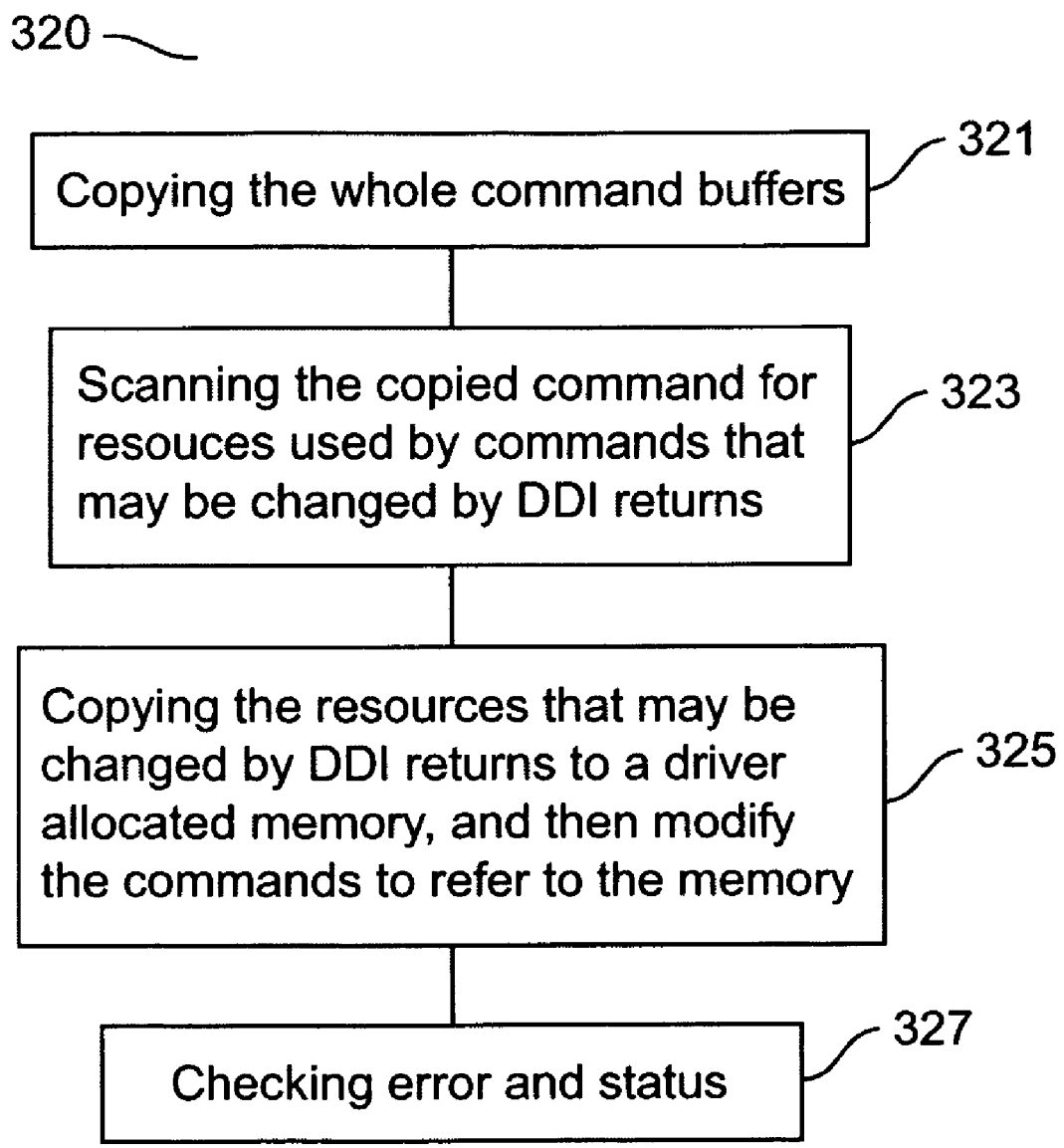
FIG. 3B is a flow chart illustrating detailed sub-steps of buffering the asynchronous commands according to one embodiment of the present invention.

FIG. 3B is a flow chart illustrating detailed sub-steps of buffering the asynchronous commands, or step 320 shown in FIG. 3A. First a whole command buffer is copied in step 321. Then DDI scans the copied command searching for resources used by commands that may be changed by DDI returns in step 323. In step 325, the resources that may be changed are copied to a driver allocated memory. Specifically, system memory resources (including vertex buffer and texture), and user memory buffers (buffers passed down by application) will be affected by DDI returns, so they are copied. After copying the buffers, the DDI modifies the corresponding commands to refer to the new driver allocated memory in step 327.

Referring to FIG. 3B, a next step 329 is to check command buffers for any error incurred during the aforementioned command pre-processing steps 321 through 325, and to check command status. For Render States and Texture Stage State (TSS), the DDI validates and writes them back to their corresponding buffers as DDI requires.

Figure 3C:
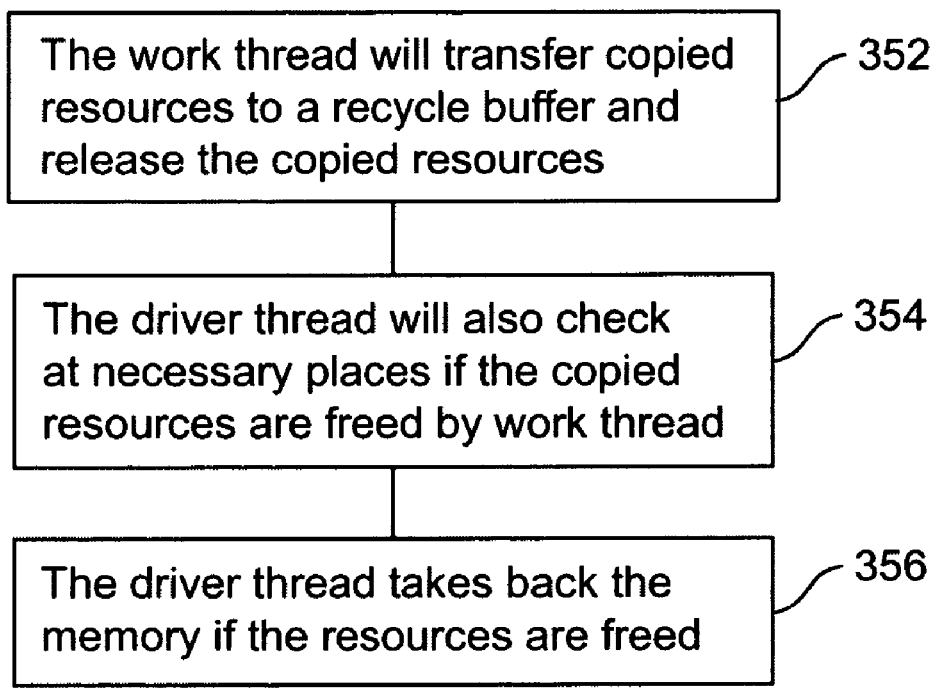
FIG. 3C is a flow chart illustrating detailed sub-steps of buffer managing according to one embodiment of the present invention.

FIG. 3C is a flow chart illustrating detailed sub-steps of buffer management, or step 350 shown in FIG. 3A. When processing the buffered command, the CPU work thread will transfer copied resources to a recycle buffer and then releases the copied resources in step 352. The driver thread will also check at necessary places if the copied resources are freed by the work thread in step 354, and will take back the memory if the resources are freed in step 356.

When all the buffered commands are processed, the CPU work thread will kick off the commands to GPU for rendering and then will go into sleep mode.

Note that the CPU work thread acts just the same as the CPU driver thread in D3DdrawPrimitives2 DDI, except the work thread ignores query read, which is executed by the driver thread immediately, and manages copied vertex buffers. In fact, with proper memory management, the present invention can make command executions appear to be just like single-threaded to application software.

This invention provides many different embodiments, or examples, for implementing different features of the invention. Specific examples of components and methods are described to help clarify the disclosure. These are, of course, merely examples and are not intended to limit the disclosure from that described in the claims.

What is claimed is:

1. A method for assisting multi-threaded command execution by a driver in a multi-core computer system, the method comprising:
    separating asynchronous commands from synchronous commands by a device driver interface (DDI);
    buffering the asynchronous commands with corresponding event tags in a buffer, wherein the buffering further comprises:
        searching for resources provided to the buffered asynchronous commands by the DDI;
        changing the resources by issuing DDI returns;
        copying the changed resources to a driver allocated memory; and
        modifying the buffered asynchronous commands by the DDI to refer the modified and buffered asynchronous commands to the driver allocated memory;
    processing the asynchronous commands from the buffer by a first CPU thread; and
    processing the synchronous commands by a second CPU thread, wherein the step of processing the synchronous commands is finished before issuing the DDI returns.

2. The method of claim 1, wherein the asynchronous commands include Create, Destroy, and Sending in a Windows operating system environment.

3. The method of claim 1, wherein the buffering further comprises checking for any error which occurred during said copying and modifying steps and command status.

4. The method of claim 3, wherein the checking further comprises:
   validating Render States and Texture Stage States;
   writing the Render States and Texture Stage States back to buffers defined by the device driver interface (DDI); and
   returning to an operating system if an error is found.

5. The method of claim 1 further comprising releasing the buffer after the asynchronous commands stored in the buffer is processed by the first CPU thread.

6. The method of claim 1, wherein the first CPU thread goes into a sleep mode when the buffered asynchronous commands are processed.

7. A method for assisting multi-threaded command execution by a driver in a multi-core computer system, the method comprising:
   separating asynchronous commands from synchronous commands by a device driver interface (DDI);
   buffering the asynchronous commands in a buffer, wherein the buffering further comprises:
      searching for resources provided to the buffered asynchronous commands by the DDI;
      changing the resources by issuing DDI returns;
      copying the changed resources to a driver allocated memory; and
      modifying the buffered asynchronous commands by the DDI to refer the modified and buffered asynchronous commands to the driver allocated memory;
   processing the asynchronous commands from the buffer by a first CPU thread; and
   processing the synchronous commands by a second CPU thread, wherein the step of processing the synchronous commands is finished before issuing the DDI returns.

8. The method of claim 7, wherein the asynchronous commands include Create, Destroy, and Sending in a Windows operating system environment.

9. The method of claim 7, wherein the copied resources include system memory resources and user memory buffers that contain data used by a drawing command.

10. The method of claim 7 further comprising managing the copied resources after the resources are freed by the first CPU thread.

11. The method of claim 10, wherein the managing further comprises:
   for the first CPU thread;
   transferring the copied resources to a recycle buffer; and
   releasing the copied resources; and
   for the second CPU thread;
   copying the resources to the buffer; and
   checking if the copied resources are freed by the first CPU thread.

12. The method of claim 7, wherein the buffering further comprises buffering Create, Destroy, and Sending commands with corresponding event tags.

13. The method of claim 7, further comprising releasing the buffer after the asynchronous commands stored in the buffer is processed by the first CPU thread.

14. The method of claim 7, wherein the first CPU thread goes into a sleep mode when the buffered asynchronous commands are processed.

15. A method for assisting multi-threaded command execution by a driver in a multi-core computer system, the method comprising:
   separating asynchronous commands from synchronous commands by a device driver interface (DDI);
   buffering the asynchronous commands in a buffer, wherein the buffering further includes:
      searching for resources provided to the buffered asynchronous commands by the DDI;
      changing the resources by issuing DDI returns;
      copying the changed resources to a driver allocated memory; and
      modifying the buffered asynchronous commands by the DDI to refer the modified and buffered asynchronous commands to the driver allocated memory;
      checking the buffer for any error which occurred during said copying and modifying steps;
   processing the asynchronous commands from the buffer by a first CPU thread; and
   processing the synchronous commands by a second CPU thread, wherein the stems commands is finished before issuing the DDI returns.

16. The method of claim 15, wherein the asynchronous commands include Create, Destroy, and Sending in a Windows operating system environment.

17. The method of claim 15, wherein the copied resources include system memory resources, user memory buffers that contain data used by a drawing command.

18. The method of claim 15 further comprising managing the copied, resources after the resources is freed by the first CPU thread.

19. The method of claim 18, wherein the managing further comprises:
   for the first CPU thread;
   transferring the copied resources to a recycle buffer; and
   releasing the copied resources; and
   for the second CPU thread;
   copying the resources to the buffer;
   checking if the copied resources are freed by the first CPU thread; and taking back the buffer if the resources are freed by the first CPU thread.

20. The method of claim 15, wherein the buffering further comprises buffering Create, Destroy, and Sending commands with corresponding event tags.

21. The method of claim 15, wherein the checking further comprises:
   validating Render States and Texture Stage States;
   writing the Render States and Texture Stage States back to buffers defined by a device driver interface (DDI); and
   returning to an operating system if an error is found.

22. The method of claim 15 further comprising releasing the buffer after the asynchronous commands stored in the buffer is processed by the first CPU thread.

23. The method of claim 15, wherein the first CPU thread goes into a sleep mode when the buffered asynchronous commands are processed.

* * * * *